(12) United States Patent
Toth et al.

(10) Patent No.: US 8,367,752 B2
(45) Date of Patent: Feb. 5, 2013

(54) GEL COAT FORMULATION

(75) Inventors: James Toth, Jersey City, NJ (US); Matt Romaine, Franklin Park, NJ (US)

(73) Assignee: Evonik Degussa Corporation, Parsippany, NJ (US)

( * ) Notice: Subject to any disclaimer, the term of this patent is extended or adjusted under 35 U.S.C. 154(b) by 0 days.

(21) Appl. No.: 13/021,113

(22) Filed: Feb. 4, 2011

(65) Prior Publication Data

US 2011/0123750 A1    May 26, 2011

Related U.S. Application Data

(63) Continuation of application No. 11/780,765, filed on Jul. 20, 2007, now abandoned.

(51) Int. Cl.
*C08K 3/36* (2006.01)
*C08K 3/34* (2006.01)
*C08L 67/06* (2006.01)
*C01B 33/12* (2006.01)
*C09J 201/00* (2006.01)
*C08K 9/06* (2006.01)

(52) U.S. Cl. ........ 523/500; 523/177; 523/209; 523/216; 523/513; 523/521; 524/492; 524/493; 524/847; 423/339; 106/287.34

(58) Field of Classification Search ............... 523/500, 523/177, 209, 216, 521, 513; 524/492, 493, 524/847; 423/339; 106/287.34
See application file for complete search history.

(56) References Cited

U.S. PATENT DOCUMENTS

| 3,920,590 | A | * | 11/1975 | Jacobs et al. | 521/113 |
| 4,216,294 | A | * | 8/1980 | Halle et al. | 521/99 |
| 4,497,918 | A | | 2/1985 | Wason | |
| 4,522,954 | A | * | 6/1985 | Ive | 521/78 |
| 4,623,478 | A | * | 11/1986 | Pastorino | 516/11 |
| 5,294,485 | A | | 3/1994 | Takao et al. | |
| 2007/0001343 | A1 | | 1/2007 | Pulman et al. | |

FOREIGN PATENT DOCUMENTS

EP    1 897 917 A1    3/2008

OTHER PUBLICATIONS

SIPERNAT 22 physico-chemical data; Evonik Industries AG, Feb. 2012.*
CAB-O-SIL M-5 Product Form; 4/04; p. 1; Cabot Corporation.
SIPERNAT 22 LS Product Information; 4/08; p. 1; Evonik Industries.

* cited by examiner

*Primary Examiner* — Michael Pepitone
(74) *Attorney, Agent, or Firm* — Oblon, Spivak, McClelland, Maier & Neustadt, L.L.P.

(57) ABSTRACT

New gel coat composition, in particular new marine gel coat compositions, a process for their manufacture as well as their use to coat surfaces of articles exposed to light, water and solvents. The gel coats incorporate a precipitated silica having

- A BET surface of from 150 to 250 $m^2/g$
- A $SiO_2$ content of more than or equal to 98.5% by weight
- A $Na_2O$ content of less than or equal to 0.5% by weight.

21 Claims, No Drawings

GEL COAT FORMULATION

The present application is a continuation application of U.S. Ser. No. 11/780,765, filed on Jul. 20, 2007 (now abandoned).

FIELD OF THE INVENTION

This invention relates to new gel coat compositions, in both cured and uncured form, in particular new marine gel coat compositions, to a process for their manufacture as well as to their use to coat surfaces exposed to light, water and solvents.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

Gel coats are high performance resins, in particular unsaturated polyester (UPE) resins, that are applied to the outside of a product/article for aesthetics but also to provide resistance to weathering. Gel coats may be clear or colored. Colored gel coats typically contain a high percentage of fillers such as talc, calcium carbonate, titanium dioxide or other pigments.

The use of fumed silica in gel coats, especially in unsaturated polyester (UPE) resins, is an old and very well known technology. Precipitated silica has also been utilized from at least the early 1980's. In 1985, the J. M. Huber Corporation was granted a U.S. Pat. No. 4,497,918 for utilizing combinations of precipitated and fumed silica in thixotropic unsaturated polyester formulations. Similar marine gel coats are disclosed in US 200710001343.

Both fumed silica and standard precipitated silica have limitations when used in gel coat formulations for marine or other corrosive environments. Fumed silica tends to cause porosity in the cured gel coat. The presence of porosity can undermine the quality of corrosion resistant resins because porosity makes a coating susceptible to accelerated weathering and blistering when exposed to light, water, solvents, etc.. Standard precipitated silica can vastly reduce the presence of porosity, but can lead to a greater level of osmostic pressure and thus a faster rate of weathering.

Compared to precipitated silica, fumed silica is more efficient at adding viscosity, is more thixotropic, and provides better clarity. On the other hand advantages of precipitated silica compared to fumed silica include faster and shear independent dispersion, lower cost, better leveling of the coating or casting, and in some cases less viscosity drift. As consequence in many cases, a blend of fumed and precipitated silica is utilized to achieve the benefits of both silica types. This, however, is not an acceptable situation for manufacturers of gel coats because two different kinds of silica have to be purchased and stored, which causes the need of two different storing devices. In addition, it is still necessary to use at least partly fumed silica having a much higher price compared to precipitated silica.

Other measures that have been used to prevent blushing, in particular of watercrafts, include applying an initial clear gel coat composition to the watercraft mold surface followed by a pigmented and filled gel coat composition applied behind the clear coat, or applying a pigmented and filled gel coat composition to the watercraft mold surface and coating the finished demolded watercraft part (e.g., a hull) with an exterior automotive paint. Both these measures require extra time and materials, and introduce an additional required interface in the finished watercraft part.

In summary, therefore, it can be stated that there is a strong need for new gel coats suitable to reduce costs and to simplify the production process.

SUMMARY OF THE INVENTION

One problem underlying the present invention was to provide a new gel coat from which the above mentioned disadvantages of the gel coats of the state of the art are completely or at least partially eliminated. A further aim was to provide a process for preparing such gel coats.

It has now surprisingly been found by the inventors, that these problems can be solved by gel coating compositions as described herein and using, in particular, a precipitated silica having A BET surface of from 150 to 250 $m^2/g$
A $SiO_2$ content of greater than or equal to 98.5% by weight
A $Na_2O$ content of less than or equal to 0.5% by weight.

DETAILED DESCRIPTION OF THE PREFERRED EMBODIMENTS

A first embodiment of the present invention are cured and uncured gel coat compositions comprising at least one precipitated silica having A BET surface of from 150 to 250 $m^2/g$
A $SiO_2$ content of more than or equal to 98.5% by weight
A $Na_2O$ content of less than or equal to 0.5% by weight.

The present invention also provides cured and uncured gel coats comprising precipitated silica which in addition to the above-stated parameters, independently of one another, have one or more of the following physicochemical parameters:

A conductivity of less than or equal to 450 µS/cm
A mean particle size of from 0.1 to 14 µm The present invention further provides a process for preparing cured and uncured gel coats comprising at least one precipitated silica having A BET surface of from 150 to 250 $m^2/g$
A $SiO_2$ content of more than or equal to 98.5% by weight
A $Na_2O$ content of less than or equal to 0.5% by weight
wherein the silica(s) is combined (e.g., mixed) with at least one unsaturated polyester resin.

The present invention also provides a process for preparing cured and uncured gel coats wherein the precipitated silica in addition to the above-stated parameters, independently of one another, have one or more of the following physicochemical parameters:

A conductivity of less than or equal to 450 µS/cm
A particle size of from 0.1 to 14 µm The present invention further provides products/articles coated with the cured and uncured gel coats of the present invention, and methods for coating articles with invention gel coats. In particular, articles such as watercraft parts (hulls, etc.) comprising a gel coat of the present invention in its outermost layer which is exposed to the environment are preferred.

The gel coats of the present invention show several advantages compared to gel coats known in the prior art.

One important advantage is that the gel coats of the invention show excellent application performance without the need to use a mix of precipitated and fumed silica. In other words one of the key problems that has been solved is that it is now possible to use only one filler, i.e. the precipitated silica described above, or at least to reduce the amount of pyrogenic silica significantly and thus to reduce the cost of the formulation significantly.

A further advantage of the gel coats of the invention is their superior performance compared to conventional gel coats. The gel coats of the invention show, for example, an improved resistance to weathering and blistering when exposed to light, water, solvents, etc. In addition, after exposure to water over an extended period of time no significant changes in gel coat color could be observed. This effect is particularly noticeable in dark colors.

Thus, the gel coating compositions of the invention may be produced with lower cost due to the new filler and simultaneously show improved application performances.

The terms gel coat(s), gel coating composition(s) and gel coat composition(s) are used synonymously herein. A gel coat according to the present invention comprises at least one resin, preferably prepromoted resin, more preferably a polyester, particular preferred an unsaturated polyester and may be clear or colored. In particular, preferred gel coats of the present invention are marine gel coats, especially marine gel coats used to coat watercrafts, very especially large watercrafts, that are immersed for long periods of time (e.g. for a week or more, a month or more, or even longer) into a corrosive environment such as salt or fresh water. Cured and uncured gel coats of the invention may comprise more than one batch of silica meeting the stated requirements, and may include further additives, including those disclosed in detail below. Those of ordinary skill know how to cure gel coat compositions, for example at room temperature and/or with heating. Thus, based on the present description, those of ordinary skill in the art can prepare the present gel coats in both cured and uncured form. As discussed herein, the invention gel coat(s), gel coating composition(s) and gel coat composition(s) include both cured and uncured forms of same.

In a preferred embodiment, the gel coats of the invention are colored gel coating compositions and comprise at least one precipitated silica having the following physico chemical properties:

A BET surface of from 150 to 250 m²/g, including 170, 190, 200, 210, and 230 m²/g, A $SiO_2$ content of more than or equal to 98.5% by weight, including more than 99 and 99.5% by weight, A $Na_2O$ content of less than or equal to 0.5% by weight, including less than or equal to 0.4, 0.2 and 0.1% by weight.

Without being bound by any specific theory, the inventors are of the opinion that the superior weather resistance of the gel coats of the invention is caused by the precipitated silica used. In particular the high purity of the silica used, i.e. the high $SiO_2$ content and the low sodium oxide content compared to standard precipitated silica, may be at least in part responsible for the superior performance obtained. Thus, in a preferred embodiment of the invention the precipitated silica used have one or more of the following:

a $SiO_2$ content of more than or equal to 99.0% by weight, more preferably between 99.0 and 99.95% by weight, most preferably 99.0 to 99.9% by weight and particular preferred 99.1 to 99.85% by weight;

a $Na_2O$ content of less than or equal to 0.5% by weight, more preferably of from 0.01 to 0.5% by weight, even more preferably of from 0.1 to 0.40% by weight, most preferably of from 0.01 to 0.30% by weight, especially preferred 0.01 to 0.20% by weight and very especially preferred 0.02 to 0.10% by weight.

A parameter characterizing the porosity and thus the thickening properties of the precipitated silica used in the gel coats is the BET surface. The BET surface of the silica used in the gel coats of the invention is of from 150 to 250 m²/g, preferably 160 to 210 m²/g, more preferably 170 to 200 m²/g and especially preferred 170 to 195 m²/g.

The anti-blushing effect of the gel coating compositions of the present invention may be further improved if the overall salt content, i.e. not only the $Na_2O$ content, of the precipitated silica used is reduced to a minimal amount. For example, it is advantageous to reduce, both singularly and in partial or total sum, salts including $SO_3$, $AL_2O_3$, $Fe_2O_3$, $K_2O$, and $TiO_2$. The overall salt content is characterized by the conductivity of the precipitated silica. Consequently in another preferred embodiment the precipitated silica used in the gel coats of the present invention exhibit a conductivity of less than or equal to 450 µS/cm, more preferably of less than or equal to 350 µS/cm, even more preferably of from 0.1 to 250 µS/cm, very preferably of from 1 to 150 µS/cm, with especial preference of from 10 to 100 µS/cm, with very especial preference of from 10 to 80 µS/cm and most preferably 10 to 50 µS/cm.

Another improvement of the gel coats of the invention may be achieved if the mean particle size of the precipitated silica used is in the preferred range of from 0.1 to 14 µm. A small particle allows to produce a smooth surface of the coating and in addition may contribute to the scratch resistance of the coating. Preferred mean particle sizes include from 0.5 to 10 µm, more preferably of from 1 to 9 µm, very preferably of from 2 to 8.5 µm, with especial preference of from 4 to 8.5 µm.

The precipitated silica described also functions as thixotropic agents which when added to the gel coat composition generally will change the slope of its rheology curve, preferably without undesirably degrading the properties of the cured gel coat composition. In this regard, the amount of precipitated silica in the gel coats of the present invention is not specifically limited, and can be varied according to the results desired. Without being limiting, typical amounts include from 0.1 to 15 wt. %, preferably 0.5 to 10 wt. %, and more preferably 0.5 to 2.5 wt. % of the total weight of the gel coat composition, including 1, 2, 3, 4, 5, 6, 7, 8, 9, 10, 11, 12, 13, 14 and 15% as well as all values and subranges therebetween.

Precipitated silica products employed in the present invention include synthetic silicon dioxide materials prepared by the acidulation of an alkali metal silicate such as sodium silicate with an acidifier such as sulfuric acid under controlled reaction conditions. Precipitated silica differ from pyrogenic silica, also called fumed silica, which are well known in the art and are prepared by the hydrolysis of silicon tertrachloride vapor in a flame of hydrogen and oxygen at elevated temperature. Pyrogenic silica are sold commercially under tradenames such as Cab-o-Sil® and Aerosil®.

A precipitated silica fulfilling useful in the gel coats of the invention is available on the market, e.g. the Sipernat® FPS-5 of Degussa® Corporation, Parsippany, N.J., USA.

Besides the precipitated silica described above, the gel coating compositions of the present invention may optionally comprise at least one inorganic and/or organic pigment. Representative pigments impart coloration (including white or black coloration) and opacity to the disclosed gel coat compositions, and usually are obtained in the form of a paste or other dispersion of the dry pigment in a compatible carrier, e.g., at about 15 to about 40 wt. % dry pigment solids based on the dispersion weight. The pigment dispersion may also contain wetting agents, dispersing agents, and inhibitors, in minor amounts. Suitable carrier resins include unsaturated polyester resins, saturated polyester resins, urethane diacrylates, acrylic silicones, or other carriers that will be familiar to those skilled in the art. The pigment dispersion may for example be prepared by adding the pigment and other ingredients to the carrier resin, then mixing in a grinding machine. Representative pigments include treated or untreated organic or inorganic pigments and mixtures thereof, such as titanium dioxide, carbon black, iron oxide black, phthalo blue, phthalo green, quinacridone magenta, LF orange, arylide red, quinacridone red, red oxide, quinacridone violet, LF primrose yellow, yellow oxide and other pigments that will be familiar to those skilled in the art. Suitable pigments are commercially available from a variety of suppliers including Ciba Specialty Chemicals, Sun Chemical, Clariant and Cabot Corp. The pigments are preferably used in an amount sufficient to provide an opaque cured coating at the desired thickness level, e.g., at pigment dispersion weights of about 1 to about 30 wt. %, about 5 to about 25 weight or about 5 to about 20 wt. % of the gel coat composition.

In addition, the gel coats may optionally comprise at least one other extender filler like clay, ground limestone, mica, talc, aluminum trihydrate, barium sulfate, standard precipitated silica, fumed silica and the like. Said extender fillers may also contribute to impart thixotrophy to the gel coats of the invention. Even though is has to be emphasized, that gel coating compositions of the invention comprising a precipitated silica having physico-chemical properties as disclosed above can be produced without additional extender fillers without a decrease in their performance, it is nevertheless possible to add such additional fillers if desired. These amounts of such fillers are not limited, although they are typically added in amounts of from about 5 to about 40 wt. % of the gel coat composition.

In case the gel coats of the invention are marine gel coating compositions, they preferably are sufficiently free of water-attackable (e.g., water-accessible and water-susceptible) extender filler so that the cured coating will not exhibit blushing after long-term immersion in water. Typical extender fillers in that case include chopped or milled fiberglass, talc, silicone dioxide, titanium dioxide, wollastonite, mica, alumina trihydrate, clay, calcium carbonate, magnesium carbonate, barium carbonate, calcium sulfate, magnesium sulfate and barium sulfate. While small amounts of water-attackable extender filler may be tolerated, preferably no more than about 2 wt. %, and more preferably no more than about 1 wt. %, including no more than 0.8, 0.5, 0.3 and 0.1 wt. % water-attackable extender filler is employed in the gel coat composition.

A component of the gel coating compositions of the present invention is the high performance resin. Any variety of unsaturated polyester resins may be employed in the disclosed gel coat compositions. Representative unsaturated polyester resins are described in U.S. Pat. Nos. 4,742,121, 5,567,767, 5,571,863, 5,688,867, 5,777,053, 5,874,503 and 6,063,864 and in PCT Published Application Nos. WO 94107674 A1, WO 00123495 A1 and WO 031101918A2. The polyester resin may be prepared from the condensation of one or more carboxylic acids (such as mono, di- or poly-functional unsaturated or saturated carboxylic acids) or their derivatives (such as acid anhydrides, C, alkyl esters, etc.) with one or more alcohols (including mono-functional, di-functional and poly-functional alcohols). The carboxylic acid or derivative may for example be a mixture of an unsaturated carboxylic acid or derivative and a saturated carboxylic acid or derivative. The unsaturated carboxylic acids or their derivatives may for example have about 3 to about 12, about 3 to about 8, or about 4 to about 6 carbon atoms. Representative unsaturated carboxylic acids and their derivatives include maleic acid, fumaric acid, chloromaleic acid, itaconic acid, citraconic acid, methylene glutaric acid, mesaconic acid, acrylic acid, methacrylic acid, and esters or anhydrides thereof. Representative unsaturated carboxylic acids and their derivatives include maleic, fumaric acids, fumaric esters and anhydrides thereof. An unsaturated carboxylic acid or its derivative may for example be present in an amount from about 20 to about 90 mole percent, about 35 to about 75 mole percent, or about 50 to about 65 mole percent of the acids or acid derivatives used to make the unsaturated polyester resin. The saturated carboxylic acids and their derivatives may for example have from about 8 to about 18, about 8 to about 15, or about 8 to about 12 carbon atoms. Representative saturated carboxylic acids and their derivatives may be aromatic, aliphatic or a combination thereof, and include succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, hexahydrophthalic acid or anhydride, tetrachlorophthalic acid, chlorendic acid or anhydride, dodecanedicarboxylic acids, nadic anhydride, cis-5-norbornene-2,3-dicarboxylic acid or anhydride, dimethyl-2,6-naphthenic dicarboxylate, dimethyl-2,6-naphthenic dicarboxylic acid, naphthenic dicarboxylic acid or anhydride and 1,4-cyclohexane dicarboxylic acid. Other representative carboxylic acids include ethylhexanoic acid, propionic acid, trimellitic acid, benzoic acid, 1,2,4-benzenetricarboxylic acid, 1,2,4,5-benzenetetracarboxylic acid and anhydrides thereof. Representative aromatic saturated carboxylic acids include o-phthalic acid, isophthalic acid and their derivatives. Representative aliphatic saturated carboxylic acids include 1,4-cyclohexane dicarboxylic acid, hexahydrophthalic acid, adipic acid and their derivatives. The saturated carboxylic acids or their derivatives may for example be present in an amount from about 10 to about 80 mole percent, about 25 to about 65 mole percent, or about 35 to about 50 mole percent of the acids or acid derivatives used to make the unsaturated polyester resin. Also, an aromatic carboxylic acid may for example be present in an amount from 0 to 100 percent, from 0 to about 50 percent, or from 0 to about 25 percent of the saturated acids or acid derivatives used to make the unsaturated polyester resin, and an aliphatic carboxylic acid may for example be present in an amount from 0 to 100 percent, from about 50 to 100 percent, or from about 75 to 100 percent of the saturated acids or acid derivatives used to make the unsaturated polyester resin.

Representative alcohols for use in making the unsaturated polyester resins include alkanediols and oxaalkanediols such as ethylene glycol, 1,2-propylene glycol, propane-3-diol, 1,3-butylene glycol, butene-1,4-diol, hexane-1,6-diol, diethylene glycol, triethylene glycol, polyethylene glycol, cyclohexane-1,2-diol, 2,2-bis-(p-hydroxycyclohexyl)-propane, 5-norbornene-2,2-dimethylol, 2,3-norbornene diol, cyclohexane dimethanol, and the like. Alcohols having a neo-structure such as 1,2-propanediol, 2-methyl 1,3-propanediol, 2,2-dimethyl heptanediol, 2,2-dimethyl octanediol, 2,2-dimethyl-1,3-propanedio(nle opentylglycol), pentaerythritol, dipentaerythritol, tripentaerythritol, trimethylol propane, di-trimethylol propane, 2,2,4-trimethyl-1,3-pentanedio1,2-butyl-2-ethyl-1,3-propanediol, 3-hydroxy-2,2-dimethylpropyl3-hydroxy-2,2-dimetphyrolpanate, and the like may be preferred. Monofunctional alcohols may also be used to prepare the unsaturated polyester resin. Representative monofunctional alcohols include benzyl alcohol, cyclohexanol, 2-ethylhexyl alcohol, 2-cyclohexyl ethanol, 2,2-dimethyl-1-propanol and lauryl alcohol. Where a monofunctional alcohol is used, the amount may for example be less than about 10 mole percent, or less than about 5 mole percent of the alcohols used to make the unsaturated polyester resin.

The unsaturated polyester resin may be prepared by esterification techniques that will be familiar to those skilled in the art, for example by using catalysts (e.g., esterification or transesterification catalysts) that will likewise be familiar to those skilled in the art. The esterification process is typically carried out until the polyester attains an acid number corresponding to the desired molecular weight. For example, the final acid number may be from about 7 to about 30, the number average molecular weight (Mn) may be from about 800 to about 3600, and the weight average molecular weight (Mw) may be from about 1,300 to about 11,000. The acid number may be reduced by increasing the reaction temperature, carrying out the reaction for a longer period of time, or by adding an acid neutralizer as will be familiar to those skilled in the art.

The unsaturated polyester resin may also be formed by reacting an oligoester having a weight average molecular weight of about 200 to about 4000 with a diisocyanate and a hydroxyalkyl(meth)acrylate to provide a urethane acrylate having terminal vinyl groups, as described in the abovementioned U.S. patent application Ser. No. 10/1521,225. The urethane acrylate resin may be used as is, or in a mixture with another unsaturated polyester resin such as an aliphatic or aromatic unsaturated polyester resin.

While not limited, the unsaturated polyester resin may for example represent about 25 to about 94 wt. %, about 30 to about 89 wt. %, or about 40 to about 79 wt. % of the gel coat composition.

Beside of the components disclosed above the gel coats of the invention may comprise additional components which are described below.

Reactive diluents may be used. Representative examples include vinylbenzene(styrene monomer), methyl methacrylate (MMA), and non-hazardous air pollutant (non-HAPS) reactive diluents such as substituted styrenes (e.g., vinyltoluene, para-tertiary-butylstyrene, para-methylstyrene or divinylbenzene); mono-, di-, and poly-functional esters of unsaturated monofunctional acids (such as acrylic acid and methacrylic acid) with alcohols or polyols having from 1 to about 18 carbon atoms; and mono-, di-, and poly-functional esters of unsaturated monofunctional alcohols with carboxylic acids or their derivatives having from 1 to about 18 carbon atoms. Other suitable reactive diluents include, for example, acrylates, methacrylates, phthalates such as diall-yl phthalate; A triallylcyanurates; vinyl ethers; and the like. Representative acrvlates and methacrvlates include butanediol dimethacrvlate, trimethylolpropane trimethacrylate, ethylene dimethacrylate (EGDMA), polyethylene glycol dimethacrylate (PEGDMA), polypropylene glycol dimethacrylate (PPGDMA), trimethylol propane trimethacrylate (TMPTMA), tetramethylol propane trimethacrylate, dipropylene glycol dimethacrylate, isodecyl methacrylate, 1,3-butylene glycol dimethacrylate, 2-hydroxy ethyl methacrylate (2-HEMA), 1,6 hexane diol dimethacrylate (HDODMA), trieththylene glycol dimethacrylate (TEGDMA), acetoacetoxyethyl methacrylate (AAEM) and the acrylate counterparts thereof. Mixtures of reactive diluents may be used. Preferred reactive diluents include styrene, methyl methacrylate, vinyltoluene, para-tertiary-butylstyrene, para-methylstyrene, EGDMA, 2-HEMA and mixtures thereof. The reactive diluent may for example represent about 5 to about 50 wt. %, about 10 to about 45 wt. %, or about 20 to about 35 wt. % of the gel coat composition.

Another component that may be present is one or more promotors. Representative promoters for use in the gel coat compositions are electron donating species that help in the decomposition of an initiator or catalyst and facilitate or speed curing of the gel coat composition at relatively low temperatures, e.g., at temperatures of about 0 to about 30° C. Representative promoters include metal compounds (e.g., cobalt, manganese, potassium, iron, vanadium, copper, and aluminum salts of organic acids); amines (e.g., dimethylaniline, diethylaniline, phenyl diethanolamine, dimethyl paratoluidine, and 2-aminopyridine); Lewis acids (e.g., boron fluoride dihydrate and ferric chloride); bases (e.g., tetramethyl ammonium hydroxide); quaternary ammonium salts (e.g., trimethyl benzyl ammonium chloride and tetrakismethylol phosphonium chloride); sulfur compounds (e.g., dodecyl mercaptan and 2-mercaptoethanol); dimethyl acetoacetamide; ethyl acetoacetate; methyl acetoacetate and mixtures thereof. For example, cobalt salts of organic acids may be used to facilitate the low temperature decomposition of peroxide catalysts and cure of the disclosed gel coat compositions. Preferred promoters include cobalt octanoate, potassium octanoate, dimethyl acetoacetamide, ethyl acetoacetate, methyl acetoacetate and mixtures thereof. The promoters typically are used in an amount of about 0.05 to about 3 wt. %, or about 0.05 to about 2 wt. % of the gel coat composition.

Another component that may be present is one or more inhibitors. Inhibitors help prolong or maintain shelf life for the uncured gel coat composition and include free-radical inhibitors or scavengers such as quinones (e.g., hydroquinone (HQ), toluhydroquinone (THQ), mono-tertiarybutyl hydroquinone (MTBHQ), di tertiary-butyl hydroquinone (DTBHQ), napthaquinone (NQ), and monomethyl ether hydroquinone (MEHQ)), butylated hydroxy toluene (BHT), tertiary butyl catechol (TBC), and the like. The inhibitor amount may for example be from about 0.01 to about 0.5 wt. %, from about 0.01 to about 0.3 wt. % or from about 0.01 to about 0.1 wt. % of the gel coat composition.

The gel coat composition may also include other adjuvants that will be familiar to those skilled in the art, including suppressants, surface tension agents, air release agents, initiators and catalysts. Suppressants may reduce volatile organic emissions, and include materials described in the above-mentioned U.S. Pat. No. 5,874,503. When employed, the suppressant amount may for example be up to about 2 wt. %, up to about 1.5 wt. %, or from about 0.1 to about 1 wt. % of the gel coat composition.

Surface tension agents may be added to lower surface tension at the surface of the cured gel coat, and include silicones such as dimethyl silicones, liquid condensation products of dimethylsilane diol, methyl hydrogen polysiloxanes, liquid condensation products of methyl hydrogen silane diols, dimethylsilicones, aminopropyltriethoxysilane and methyl hydrogen polysiloxanes, and fluorocarbon surfactants such as fluorinated potassium alkyl carboxylates, fluorinated alkyl quaternary ammonium iodides, ammonium perfluoroalkyl carboxylates, fluorinated alkyl polyoxyethylene ethanols, fluorinated alkyl alkoxylates, fluorinated alkyl esters, and ammonium verfluoroalkvl sulfonates. Revresentative commercially available surface tension agents include BYK-306™ silicone surfactant (from BYK-Chemie USA, Inc.), DCIOO and DC200 silicone surfactants (from Dow coming co,), the MODAFO series of additives (from Solutia, Inc) and SF-69 and SF-99 silicone surfactants (from GE silicones Co,). When employed, the surface tension agent amount may for example be up to about 1 wt. %, or from about 0.01 to about 0.5 wt, % of the gel coat composition.

Another component that may be present is one or more air release agents. Air release agents may assist in curing the gel coat composition without entrapping air and thereby causing weakness or porosity. Typical air release agents include silicone or non-silicone materials including silicone defoamers, acrylic polymers, hydrophobic solids, and mineral oil based paraffin waxes. Commercially available air release agents include BYK-066, BYK-077, BYK-500, BYK-501, BYK-515, and BYK-555 defoamers (from BYK-Chemie USA, Inc.). When used, the air release agent amount may for example be up to about 1.5 wt. %, up to about 1 wt. %, or from about 0.1 to about 0.5 wt. % of the gel coat composition.

Initiators or catalysts may be added to the gel coat composition at the time of application to a mold surface or may be latent initiators or catalysts that may be included in the gel coat composition as supplied to the end user and are activated during the application process. Representative initiators or catalysts include free-radical catalysts such as peroxide catalysts (e.g., benzoyl peroxide, methyl ethyl ketone peroxide, cumene hydroperoxide, and the like), azoalkane catalysts and commercially available initiators or catalysts such as Luperox™ DDM9 and DHD9 catalyst (from Arkema), HIGH POINT™ 90 catalyst (from Chemtura) and CADOX™ L50a catalyst (from Akzo Nobel). Representative radiationactivated or heat-activated initiators or catalysts include IRGACURE™ 819 initiator (from Ciba Specialty Chemcals) and cumene hydroperoxide. When used, the initiator or catalyst amount may for example be about 0.5 to about 3 wt. %, about 1 to about 2.5 wt. %, or about 1.2 to about and 2 wt. % of the unsaturated polyester resin weight.

The gel coats of the present invention may be produced by combining at least one silica having A BET surface of from 150 to 210 m$^2$/g
A $SiO_2$ content of more than or equal to 98.5% by weight
A $Na_2O$ content of less than or equal to 0.5% by weight with at least one unsaturated polyester resin. The precipitated silica may in addition have one or more of the following physicochemical parameters:

A conductivity of less than or equal to 450 μS/cm
A particle size of from 0.1 to 14 μm In a preferred embodiment the invention gel coat composition may be prepared for example by blending the unsaturated polyester resin with suitable precipitated silica and the remaining ingredients in any convenient order. The suitable precipitated silica may be a commercial product, e.g. Sipernat® FPS-5 of Degussa® Corporation, Parsippany, N.J., USA or may be obtained by adjusting the $Na_2O$ content, salt content, etc. of commercial precipitated silica like Sipernat® 22 LS Degussa® Corporation, Parsippany, N.J., USA. Adjustment of the salt content may be achieved for example by an elongated or an more effective washing operation.

If desired, some or all of the reactive diluents may be added at the completion of blending to yield a mixture having a preferred viscosity (e.g., a viscosity of about 2,000 to about 10,000 centipoise, about 3,000 to about 8,000 centipoise, or about 3,500 to about 5,000 centipoise as measured using a BROOKFIELD viscometer from Brookfield Engineering Laboratories and Spindle No. 4 at 25° C.). The promoter amount may be adjusted or inhibitors may be added or adjusted to obtain a gel coat composition having a desired gel and cure time. The gel coat composition may also be prepared by mixing a pigment (e.g., a pigment dispersion) with a conventional clear gel coat composition without also adding a deleterious amount of extender filler.

The present invention further provides products/articles coated with the gel coats of the present invention. Coating can be partial or complete. In particular articles comprising a gel coat of the present invention in its outermost layer which is exposed to the environment are preferred. Particularly preferred are watercraft hulls coated with a gel coat according to the invention.

The products/articles to be coated include molded articles made of plastic or other materials. In particular the coated, molded articles, optionally fiber-reinforced, are typically are made by spreading a gel coat composition over the surface of a mold having a surface corresponding to the article in negative relief. After cure, the gel coat composition becomes the outermost layer of the molded article and will become exposed to the environment. The gel coat composition is spread across the mold surface by any one of a number of techniques (e.g., brushing, hand lay-up, or spraying) and usually as a relatively thick layer, e.g., up to about a 0.8 mm thick wet coating. After the gel coat composition is applied to the mold surface, it is at least partially cured. A strengthening plastic support, optionally fiber-reinforced, can then applied behind the partially or fully cured gel coat composition using any one of a number of techniques (e.g., by brushing, hand lay-up, or spraying for open mold processes, or by casting for closed mold processes), and the resulting laminate structure is cured and demolded. Curing can be promoted through the use of free radical polymerization initiators.

The gel coat layer ensures weather and wear resistance, and if the molded article is fiber-reinforced, can also help mask the fiber reinforcement pattern which may show through the gel coat due to inherent resin shrinkage that occurs around the fibers during cure.

The gel coat composition may applied to a mold surface in one or more layers and at least partially cured using techniques that will be familiar to those skilled in the art, layer by layer if desired, including the above-mentioned open mold or closed mold processes. The layer or layers of the gel coat composition may each for example have a wet thickness of about 0.05 to about 0.8 mm.

A variety of strengthening plastic support materials may be formed behind the gel coat composition in one or more layers using techniques that will be familiar to those skilled in the art. Representative strengthening plastic support materials include fiber-reinforced plastics (made e.g., using fiberglass cloth or fiberglass roving), carbon fiber composites, reinforced or unreinforced surface molding compounds and other reinforced or unreinforced plastics such as reinforced polyesters or reinforced epoxies. The strengthening plastic support overall thickness before cure may for example be about 5 mm to about 125 mm.

If desired, one or more intervening layers such as a barrier coat, skin coat or print blocker may be applied between the gel coat composition and the strengthening plastic support. Suitable intervening layer materials will be familiar to those skilled in the art, and include vinyl esters, polyesters and epoxy resins. The wet thickness of such intervening layers will also be familiar to those skilled in the art, and may for example be about 0.1 to about 3 mm.

Typical examples for products/articles coated with the gel coats of the invention comprise parts for boats, wind mills, swimming pools, tub and shower, sanitary ware, tanks, housing, corrosion resistant applications such as pipes, tanks, ducts, fume stacks, build panels, ships, e.g. Coast Guard Ships, electrical parts, aircraft and electronical components and other parts subjected light, water, solvents or high temperatures, automotive and application appearance parts and the like. Particular preferred are products/articles exposed to water. Very particular preferred are products/articles exposed to water for a very long time, e.g. at least one week, without interruption.

The following examples illustrate the invention and are not to be construed as limiting the scope thereof.

EXAMPLES

The reaction conditions and the physical/chemical data of the precipitated silica used in the gel coats of the invention are determined by the following methods:

Determination of the BET Surface

The BET surface is measured following ISO 9277. The procedure is used to determine the specific N2 surface area of silicas and silicates according to the BET procedure. With the method described here the measured value is determined by cryogenic adsorption of nitrogen at well defined partial pressures. The analysis is accomplished as multipoint determination and shows in the partial pressure range (p/p0) of 0.05-0.2 with measuring of altogether 5 points a linear behaviour.

Determination of DBP

The determination of the n-dibutyphtalate (DBP) absorption number is carried out using a DBP absorptometer following DIN 53601. It is used to judge the liquid adsorptive capacity of silicic acids and silicates.

For the determination a certain amount of silicic acid or silicate is introduced into the mixing chamber (kneader) of the absorptometer (Brabender Plastograph PL 3 S, Brabender Company, Duisburg). Under constant mixing DBP is added with a constant dosing rate of 4 ml/min (Electrical piston buret for the constant feeding of DBP with a counter mechanism (ml); Methrom 665). The rotational speed of the rotor blades is 125 rpm. At the beginning the measured torque is very low but towards the maximum of the liquid adsorption capacity of the sample it increases tremendously. By reaching a torque of 0.6 Nm the mixer as well as the DBP feeding are switched off by an electrical contact. Then the consumption of DBP in ml is read off from the counter mechanism of the buret. The result is given in g/100 g and is additionally corrected by the moisture content.

$$DBP \text{ number } [g/100 \text{ g}] = \frac{V \times D \times 100}{E} + d$$

V=DBP consumption in ml
D=Density of DBP (1,047 g/ml)
E=Sample weight in g (usually 12.5 g)
d=moisture correction in g/100 g The moisture correction d is determined by means of the correction table. The Loss on drying is determined according to the method described in this document. The result is given without decimal place referred to the dried material.

Correction Table:

| Loss on drying [%] | ,0 | ,2 | ,4 | ,6 | ,8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Loss on Drying (LOD)

Following ISO 787-2 the loss on drying is determined in silicas and silicates. A weighing bottle with the stopper removed is heated in the oven at 105° C. for at least 1 h. After cooling in the dessicator and inserting the stopper it is weighed (at least) to the nearest 0.01 g on a precision balance. 10+1 g of the sample are spread in a uniform layer on the bottom of the weighing bottle. The stopper is inserted again and the filled weighing bottle is weighed with a accuracy of 0.01 g ($m_{sp}$). The weighing bottle is opened cautiously and heated with the stopper (removed) in the oven at 105+2° C. for 2 h. Thereafter the weighing bottle is slowly closed with the stopper and allow to cool in a dessicator. The weighing bottle is weighed with an accuracy of 0.01 g ($m_{LOD}$). The test result is given with 1 decimal place; values of as less than 0.1% are reported as "<0.1".

$$LOD \text{ in } [\%] = \frac{(m_{sp} - m_{LOD}) \times 10}{m_{sp}}$$

$m_{sp}$=weight of original sample [g]
$M_{LOD}$=weight of residue after loss on drying [g]

Determination of Loss On Ignition (LOI)

1 g of silica original sample material is weighed accurately ($m_{sp}$) in a tared platinum crucible and is heated at 1000° C. for 2 h. After cooling down in a desciccator in presence of $P_2O_5$ the crucible was weighed again. The weight after loss on ignition ($m_{LOI}$) was calculated.

The loss of ignition (LOI) is given by the equation:

$$LOI \text{ in } [\%] = \frac{m_{sp} - m_{LOI}}{m_{sp}} \times 100$$

$m_{sp}$=weight of original sample [g]
$m_{LOI}$=weight of sample after loss on ignition [g]

Determination Loss on Ignition and of the $SiO_2$ Content 1 g of silica original sample material is weighed accurately ($m_{sp}$) in a tared platinum crucible and is heated at 1000° C. for 2 h. After cooling down in a desciccator in presence of $P_2O_5$ the crucible was weighed again. The weight after loss on ignition ($m_{GV}$) was calculated.

The residue after ignition was wetted with de-ionized water, 2 ml $HClO_4$ (70% p.a.) and 25 ml HF (40% p.a.) were added. The sample is slowly heated until strong formation of smoke will be observed. Further 2 ml HF were added and the sample is dried off again. The residue is heated at 1000° C. for 1 h. After cooling down in a desciccator in presence of $P_2O_5$ the residue is weighed ($m_{HF}$). The $SiO_2$ content is given by the equation:

$$LOI \text{ in } [\%] = \frac{m_{GV} - m_{sp}}{m_{sp}} \times 100$$

$$SiO_2 \text{ content in } [\%] = \frac{m_{GV} - M_{HF}}{m_{GV}} \times 100$$

$m_{sp}$=weight of original sample [g]
$m_{GV}$=weight of sample after loss on ignition [g]
$m_{HF}$=weight of sample after treatment with HF [g]

Determination of the $Na_2O$ Content

The $Na_2O$ content is measured by a flame atomic adsorption spectrometer.

3.0 g of the original sample are weighed accurately in a platinum cup. The sample is wetted with de-ionized water, 5 ml sulphuric acid (1:1) and 25 ml hydrofluoric acid were added. The sample is slowly heated until strong formation of smoke will be observed. In the case that residual organic material as dark residue is still observed, the sample is after-treated with $H_2O_2$. The residue is then diluted with de-ionized water and dissolved. The solution is filled up to 50 ml in a graduated sample-tube.

0.2 ml of this solution are transferred into a second tube, added with 2.5 ml CsCl solution (w(Cs=10%) and filled up to 50 ml with de-ionized water.

Further solutions with Na content of 0.1 mg/l, 0.2 mg/l and 0.3 mg/l and a blank solution were produced for calibration.

All solutions were measured by flame atomic adsorption spectroscopy at wavelength 589 nm.

The result of this measurement is the Na content in the measurement solution. The $Na_2O$ content is given by the equation:

$$Na_2O \text{ content in } [\%] = \frac{c_{Na} \times V_{sp} \times D_F \times 1.348}{\left(W - \frac{LOI}{100} \times W\right) \times 1000} \times 100$$

$CN_a$Na content measured in the measurement solution [mg/l]
$V_{sp}$=Volume [l]=0.05
$D_F$=Dilution factor=250
W=weighted sample [g]
LOI=Loss on ignition [%]
1.348=stoichiometric factor (Na→$Na_2O$)

Determination of the Conductivity

Following ISO 787-14 the method is used to determine the electrical resistivity of aqueous silica suspensions and extracts, respectively.

With appropriate amounts of the sample and distilled water a suspension with a content of 5% (m/m) is produced. Then the temperature of the suspension is adjusted to 21° C. in a thermostat and the electrical conductivity is measured by means of a conductometer (Metrohm conductometer 660 or LF 530, WTW) and a conductivity cell (Metrohm, modell 6.0908.110).

15 g of the sample being investigated and 285 g of de-ionized water are weighted into a previously tared beaker by means of a precision balance. The suspension in the beaker is stirred thoroughly, covered by a watch glass for 5 minutes (±10 sec) at room temperature by means of a magnetic stirrer with bar. Approximately 40 ml of the suspension are transferred into a 50 ml beaker and allowed to adjust at 21±0.5° C. in a thermostate. The reference temperature 21° C. is also to adjust at the conductometer.

Another 40 ml of the suspension are given in a second 50 ml beaker and the conductivity cell is prerinsed with the suspension by repeated dipping into this suspension. Then the conductivity cell is immersed into the measuring suspension adjusted to 21±0.5° C. The measuring value read from the conductivity meter corresponds with the electric conductance of the suspension at 21° C.

The result of the determination is the electrical conductivity in µS/cm of a 5% suspension (m/m) refering to a temperature of 21° C. The result is rounded to 10 µS/cm if the conductivity is >=200 µS/cm. If the conductivity is <200 µS/cm it is rounded to 1 µS/cm.

Determination of the Mean Particle Size

The mean particle size is measured following ISO 13320-1. The given testing procedure discribes the measurement of particle size distributions of silicas and silicates between 0.04 and 2500 µm by means of laser diffraction. The application of Laser diffraction using the Fraunhofer model for the determination of particle sizes is based upon the phenomenon that particles scatter light with different intensity pattern in all directions. The scattering depends on the particle size. The smaller the particles the higher the scattering angles.

The sample being investigated is to presieve by means of a 500 µm sieve before measurement. This is valid for milled product, respectively products without matters >500 µm.

To turn on of the Coulter LS 230 (Coulter Particle Size Analyzer, LS 230, Fa. Beckman-Coulter with Small Volume Module Plus—SVM and Ultrasonic Processor Sonic Vibra Cell, Model VC 70 T) see the manufacturer recommendations in the instrument manual. The instrument adjustment and offset measurement is done automatically. If the "enter sample" info appears the presieved sample is given into the dispersion fluid by means of a spatula until the following concentrations are reached:

Measurement without PIDS: Measuring concentration 10%±2%

Thereafter the dispersion is pumped through the respective module before measurement for 1 minute and is ultrasonicated for a further minute under the following conditions:

Ultrasonic performance: 25 Watt (Amplitude about 70%, has to be corrected during the procedure if necessary)
Timer: 1 minute
Pump performance: 75%

Then the measurement of the particle size distribution starts.

The mean value or further particle size values may be reported individually with one decimal place. In case of milled products the values after ultrasonication are reported (SVM-Module: after 1 min. ultrasonication).

Determination of the Tapped Density

Following ISO 787-11 the method is used to determine the tapped density and tamped volume of pigments and fillers.

A tapping volumeter with revolution counter and stroke: (3±0.1) mm as well as having a speed: (250±15) rpm (Engelsmann, Ludwigshafen, STAV 2003) is used. The test material being examined is used without having been sieved before. Defined amounts of the sample are weighed in a graduated cylinder and subjected to 1250 tapping operations. During this process the test material is gradually densified. The result of the method is the tapped density of the sample [g/l]. The tapped density D(t) is given by the equation $$D(t) = \frac{1000 \cdot m}{V}$$

whereas
D(t) tapped density of the test material [g/l]
V volume after tamping [ml]
m sample mass

Example 1

In order to compare cured unsaturated polyester gel coat samples according to the invention with an identical formulation comprising standard precipitated silica, navy blue unsaturated polyester gel coat formulations were prepared as described blow.

The precipitated silica Sipernat® FPS-5 supplied by Degussa® GmbH was used to prepare a gel coat formulation according to the invention. The comparison examples comprise two other precipitated silica products typically used in unsaturated polyester gel coats: Sipernat® 22LS supplied by Degussa® GmbH and Zeothix® 265 supplied by Huber Engineered Materials. Zeothix 265® represents a precipitated silica as claimed and used in U.S. Pat. No. 4,497,918 and thus allows a direct comparison between the gel coats according to the invention and gel coats according to U.S. Pat. No. 4,497,918. The properties of the precipitated silica used are summarized in the Table below.

TABLE 1

Analytical Data

| Example | Silica | Particle Size (µm) | DBP (g/100 g) | BET ($m^2/g$) | Tapped Density (g/L) | $SiO_2$ (wt-%) | $Na_2O$ (wt-%) | Conductivity (µS/cm) |
|---|---|---|---|---|---|---|---|---|
| I-1 | Sipernat® FPS-5 | 8.3 | 275 | 188 | 80 | 99.8 | 0.08 | 39 |
| C-1 | Sipernat® 22LS | 11.6 | 269 | 159 | 92 | 99.4 | 0.6 | 654 |
| C-2 | Zeothix® 265 | 3.6 | 255 | 161 | 84 | 98.2 | 1.5 | 531 |

For preparation of the gel coating composition Ashland Aropol S570, an Isophthalic NeoPentylGlycol (ISO NPG) UPE resin, manufactured by Ashland Distribution Co. & Ashland Specialty Chemicals Co., Columbus, Ohio, USA, was utilized as the base resin. The polyester polymer was dissolved in 28 wt-% styrene, a reactive diluent. No additional styrene was added to the gel coat. 0.15 wt-% of BYK® A555, manufactured by BYK®-Chemie GmbH, Wesel, Germany, a de-aeration agent, was added and mixed with a glass rod prior to silica dispersion. Silica was dispersed with a 50 millimeter cowles blade by a Dispermat at 5000 RPM for 10 minutes. Silica was loaded at 4.50 wt-% level. The pigment dispersion was added to the resin after the dispersion of the silica and dispersed at 3000 RPM for 5 minutes with a 50 mm cowles blade. The pigment dispersion used was Polytrend® 850-7240 Phthalo Blue RS, manufactured by Degussa® Corporation, Pasippany, N.Y., USA, and it was loaded at a 10.0 wt-% level. The final additive included in the gel coat formulation was the Cobalt promoter, 12% Cobalt Catalyst 510, manufactured by OMG®, Westlake, Ohio, USA. The Cobalt was dispersed by a 50 mm cowles blade at 1000 RPM for 1.0 minute. After the addition of all additives, a final styrene level of 23.8 wt-% resulted in the gel coat. In Table 2 an overview of all ingredients is provided:

TABLE 2

Summary of the gel coat formulation used for each sample.

| Material | Weight % |
|---|---|
| Ashland Aropol S570 Resin | 85.225 (72% Polymer, 28% Styrene) |
| Precipitated Silica | 4.500 |
| Polytrend ® 850 Phthalo Blue RS | 10.000 |
| 12% Cobalt Catalyst 510 | 0.125 |
| BYK A555 | 0.150 |
| Total | 100 |

Example 2

To compare the rheological properties of the gel coat formulation of the invention (I-1) with gel coat formulations according to the state of the art (C-1 and C-2), the rheological data for each gel coat sample prepared as described in Table-2 were measured as follows:

A Brookfield DV II+ProViscometer and RV spindles #3 or #4, depending on sample viscosity, were utilized. Viscosity readings were recorded at 2 and 20 RPM. The thixotropic index was calculated as the ratio of the viscosity at 2 RPM to that of 20 RPM. The initial viscosity and thixotropic values are detailed in Table-3. Sipernat® FPS-5 used as thickening filler in inventive formulation I-1 surpassed the performance of the other two silica Sipernat® 22LS and Zeothix® 265 used in non inventive examples C-1 and C-2 in thickening ability and thixotropic index. This is remarkable because Sipernat® 22LS and Zeothix® 265 are well known by the industry to be effective thixotropes in unsaturated polyester gel coats. Table 3 below provides a summary of the experimental results

TABLE 3

Initial Viscosity of the Navy Blue Gel Coat Formulations

| Example | Silica | Viscosity (cp) @ 2 RPM | Viscosity (cp) @ 20 RPM | Thixotropic Index |
|---|---|---|---|---|
| I-1 | Sipernat ®FPS-5 | 12550 | 3400 | 3.69 |
| C-1 | Sipernat ® 22LS | 9900 | 2890 | 3.43 |
| C-2 | Zeothix ® 265 | 10850 | 3045 | 3.56 |

Example 3

To test the color retention gel coated laminates were produced with the gel coat formulation presented in Table-2. For this Norox® MEKP-9H, a methylethyl ketone peroxide (MEKP) initiator, manufactured by NORAC®, INC., Azusa, Calif., USA, was used to cure the gel coat. 1.25 wt-% MEKP was added to the gel coat and stirred in by hand. The initiated gel coat was then applied over a 12" by 12" glass plate by a draw down bar at a thickness of 25 mils (0.6350 mm). The plate was treated with Axel XTEND™ 818, manufactured by AXEL Plastic Research Laboratories, INC., Woodside, N.Y., USA, release agent. After curing for 90 minutes at room temperature, the gel coat was backed up with fiber reinforced polyester laminate. Four layers of 1.5 ounce glass mat saturated with Ashland M625-2, a general purpose Orthophthalic laminate resin, were hand layed behind the gel coat. The laminate resin was cured with Norox® MEKP-9 initiator and allowed to cure at room temperature for 24 hours and then post cured for 4 hours at 60° C. After curing, each plate was cut into four 100 mm by 150 mm sized pieces.

One 100 mm by 150 mm of said sample plates, for each silica tested, was kept as a standard. The other three plates were used to test color retention after water exposure. A BYK Gardner Color-View was used to determine the CIE L*,a*, b* color space of each sample plate. CIE L*, a*, b* is an international color scale recommended by CIE (Commission International d'Eclairage) in 1976. L* represents lightness, a* represents the red/green region, and b* represents the yellow/blue region. CIE L*, a*, and b* are often just used by the informal abbreviation Lab. Plates were measured for their initial color value prior to being tested for their color retention. Four initial color values were taken and the average Lab values measured. Once their initial color values were recorded the three sample plates used for testing color retention had a 5 inch polyvinylchloride (PVC) pipe attached to the plate, on the gel coat side, using silicone rubber. The silicone rubber was allowed to dry for 48 hours. After the silicone rubber dried, 100 mL of de-ionized water was added to each PVC pipe, therefore only the gel coat was in contact with water. The contact area between the water and gel coat was a 50 mm diameter circle. The sample plates were then placed in a 65 degree Celsius oven. After seven days of elevated temperature, one sample plate, for each silica tested, was pulled to record the change in color. After fourteen days of the color retention test, the remaining plates were pulled and tested for the change in color. The delta E* value was calculated for each sample plate after both seven and fourteen days. Delta E* is the total color difference between samples. Delta E* is equal the square root of the sum of the delta L*, delta a*, and delta b* values squared.

The delta E value indicates a shift in color, and the smaller the delta E the lower the shift in color, or the better a sample can retain color. Typically, it is difficult the human eye to see a difference in color if the delta E is below three. Detailed in Tables 4 to 9 are the initial color coordinates, aged color coordinates, and the delta E. The inventive gel coat I-1 including Sipernat® FPS-5 displayed substantial improvement in color retention versus the no inventive examples C-1 and C2 comprising precipitated silica currently utilized as thixotropes in unsaturated polyester. The differences in delta E are summarized in Table 10 for seven and fourteen days respectively.

TABLE 4

Coloromiter results of gel coat formulation I-1 containing Sipernat® FPS-5 after 7 days water exposure:

| Data Type | L* | b* | b* |
|---|---|---|---|
| Initial Color | 4.0177 | 9.2978 | −21.5712 |
| Day 7 Color | 5.0657 | 9.9985 | −22.5087 |

Delta E* Value: 1.5710

TABLE 5

Coloromiter results of gel coat formulation I-1 containing Sipernat® FPS-5 after 14 days water exposure:

| Data Type | L* | a* | b* |
|---|---|---|---|
| Initial Color | 3.9547* | 9.3453* | −21.4973* |
| Day 14 Color 1 | 4.4697* | 10.0436* | −23.0816* |

Delta E* Value: 1.8084*
*average of two separate panels

TABLE 6

Coloromiter results of gel coat formulation C-1 containing Sipernat® 22LS after 7 days water exposure:

| Data Type | L* | a* | b* |
|---|---|---|---|
| Initial Color | 3.8676 | 9.2527 | −21.6003 |
| Day 7 Color | 5.2033 | 10.2140 | −24.3995 |

Delta E* Value: 3.2471

TABLE 7

Coloromiter results of gel coat formulation C-1 containing Sipernat® 22LS after 14 days water exposure:

| Data Type | L* | a* | b* |
|---|---|---|---|
| Initial Color | 3.8917* | 9.3128* | −21.4219* |
| Day 14 Color 1 | 5.1986* | 10.2524* | −24.6845* |

Delta E* Value: 3.6385*
*average of two separate panels

TABLE 8

Coloromiter results of gel coat formulation C-2 containing Zeothix 265® after 7 days water exposure:

| Data Type | L* | a* | b* |
|---|---|---|---|
| Initial Color | 3.9976 | 9.7336 | −22.3296 |
| Day 7 Color | 5.5198 | 11.0182 | −26.0652 |

Delta E* Value: 4.2335

TABLE 9

Coloromiter results of gel coat formulation C-2 containing Zeothix 265® after 14 days water exposure:

| Data Type | L* | a* | b* |
|---|---|---|---|
| Initial Color | 4.0745* | 9.7408* | −22.5727* |
| Day 14 Color 1 | 5.5591* | 11.0528* | −26.4257* |

Delta E* Value: 4.3326
*average of two separate panels

TABLE 10

Summary of the Coloromiter Results:

| Example | Delta E* after 7 days | Delta E* after 14 days |
|---|---|---|
| I-1 | 1.5710 | 1.8084 |
| C-1 | 3.2471 | 3.6385 |
| C-2 | 4.2335 | 4.3326 |

The analysis of the color retention of the gel coating formulations I-1, C-1 and C-2 over time while being exposed to de-ionized water, reveals significant differences in their performance. Table 10 confirms, that the gel coat according to the invention exhibits a very good color retention after 7 days as well as after 14 days. The loss of color retention observed is less than half of that measured by comparison examples C-1 and C-2. This extraordinary improvement was achieved by using a precipitated silica according to the present invention. The gel coats of the invention thus fulfill the objects of the invention, even when using only one precipitated silica instead of a mixture of precipitated silica and pyrogenic silica. As confirmed by example 2, the rheological properties are also excellent, thus use of a pyrogenic silica in addition to precipitated silica is no longer necessary.

The above written description of the invention provides a manner and process of making and using it such that any person skilled in this art is enabled to make and use the same, this enablement being provided in particular for the subject matter of the appended claims, which make up a part of the original description and including a gel coat composition comprising at least one precipitated silica having A BET surface of from 150 to 250 m$^2$/g
A SiO$_2$ content of more than or equal to 98.5% by weight
A Na$_2$O content of less than or equal to 0.5% by weight.

As used herein, the phrases "selected from the group consisting of," "chosen from," and the like include mixtures of the specified materials. Terms such as "contain(s)" and the like as used herein are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A cured or uncured gel coat composition comprising at least one resin and 0.1 to 15 wt %, based on the total weight of the composition, of at least one precipitated silica having
    A BET surface area of from 150 to 250 m$^2$/g,
    A SiO$_2$ content of more than or equal to 98.5% by weight,
    A Na$_2$O content of less than or equal to 0.5% by weight, and
    wherein the at least one precipitated silica has a conductivity of less than or equal to 450 µS/cm.

2. The gel coat composition according to claim 1, wherein the at least one precipitated silica has a mean particle size of from 0.1 to 14 µM.

3. The gel coat composition according to claim 1, wherein the at least one precipitated silica has a BET surface area of from 170 to 200 m$^2$/g.

4. The gel coat composition according to claim 1, wherein the at least one precipitated silica has a SiO$_2$ content of from 99.0 to 99.9% by weight.

5. The gel coat composition according to claim 1, wherein the at least one precipitated silica has a Na$_2$O content of form 0.01 to 0.5% by weight.

6. The gel coat composition according to claim 1, wherein the at least one precipitated silica has a conductivity of from to 1 to 150 µS/cm.

7. The gel coat composition according to claim 1, wherein the at least one precipitated silica has a mean particle size of from 2 to 8.5 µm.

8. The uncured gel coat composition according to claim 1 comprising at least one unsaturated polyester resin.

9. The uncured gel coat composition according to claim 1, comprising at least one unsaturated polyester resin having a weight average molecular weight of 1,300 to 110,000.

10. The gel coat composition according to claim 1, further comprising at least one inorganic pigment and/or at least one organic pigment.

11. The gel coat composition according to claim 1, wherein said resin is cured.

12. The cured gel coat composition according to claim 1, comprising at least one polyester resin.

13. A process for preparing a gel coat composition according to claim 1, comprising combining said at least one silica with at least one unsaturated polyester resin to form a gel coat composition, followed by optionally curing said composition.

14. The process for preparing a gel coat composition according to claim 13, comprising curing said composition.

15. The process for preparing a gel coat composition according to claim 14, comprising applying said gel coat composition to an article, followed by curing.

16. The process for preparing a gel coat composition according to claim 15, wherein the article is selected from the group consisting of watercrafts, wind mills, swimming pools, tubs, showers, sanitary ware, tanks, pipes, tanks, ducts, fume stacks, build panels, ships, electrical parts, aircraft components, and electronic components.

17. An article coated with a gel coat composition according to claim 1.

18. The article according to claim 17, wherein said gel coat composition is cured.

19. The article according to claim 18, wherein said article is fiber-reinforced.

20. The article according to claim 18, wherein the article is selected from the group consisting of watercrafts, wind mills, swimming pools, tubs, showers, sanitary ware, tanks, pipes, tanks, ducts, fume stacks, build panels, ships, electrical parts, aircraft components, and electronic components.

21. The article according to claim 18, wherein the gel coat comprises a polyester resin and wherein the article is a watercraft hull.

* * * * *